(12) United States Patent
    Uriu et al.

(10) Patent No.: US 10,019,116 B2
(45) Date of Patent: Jul. 10, 2018

(54) DISPLAY DEVICE WITH ADHESIVE LAYER AND RESIN LAYER AND MANUFACTURING METHOD THEREFOR

(71) Applicant: Panasonic Intellectual Property Management Co., Ltd., Osaka (JP)

(72) Inventors: Eiichi Uriu, Osaka (JP); Kenji Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 33 days.

(21) Appl. No.: 14/911,071

(22) PCT Filed: Aug. 8, 2014

(86) PCT No.: PCT/JP2014/004142
    § 371 (c)(1),
    (2) Date: Feb. 9, 2016

(87) PCT Pub. No.: WO2015/029350
    PCT Pub. Date: Mar. 5, 2015

(65) Prior Publication Data
    US 2016/0202842 A1    Jul. 14, 2016

(30) Foreign Application Priority Data
    Aug. 30, 2013 (JP) .................. 2013-179946

(51) Int. Cl.
    *G06F 3/041*    (2006.01)
    *G06F 3/042*    (2006.01)
    (Continued)

(52) U.S. Cl.
    CPC ........ *G06F 3/0421* (2013.01); *G02F 1/13338* (2013.01); *G06F 3/041* (2013.01);
    (Continued)

(58) Field of Classification Search
    CPC ..... G02F 1/13338; G02F 2001/133331; G02F 2202/28; G02F 2203/04103; G06F 3/041; G06F 3/0421; G06F 3/044
    See application file for complete search history.

(56) References Cited

U.S. PATENT DOCUMENTS 6,310,612 B1    10/2001    Kotsubo et al.
2001/0031074 A1*    10/2001    Yamazaki ............... G06F 21/32
                                                                        382/124
(Continued)

FOREIGN PATENT DOCUMENTS

CN    101281312 A    10/2008
CN    101303463 A    11/2008
(Continued)

OTHER PUBLICATIONS

International Search Report for corresponding International Application No. PCT/JP2014/004142 dated Sep. 22, 2014.
(Continued)

*Primary Examiner* — Ram A Mistry
(74) *Attorney, Agent, or Firm* — Renner Otto Boisselle & Sklar, LLP

(57) ABSTRACT

A touch-sensor-equipped display device includes a touch sensor 10, a transparent substrate 1, an image-display body 2, an adhesive layer formed of a thermal adhesive film 5, and a resin layer 3. The touch sensor 10 includes a first conductive layer 12A composed of a plurality of first electric conductors 13A, a second conductive layer 12B composed of a plurality of second electric conductors 13B, and at least one support film 11. The plurality of first electric conductors 13A extend in a different direction from a direction in which the plurality of second electric conductor 13B extend. The thermal adhesive film 5 bonds the at least one support film 11 and the transparent substrate 1. The resin layer 3 is
(Continued)

disposed between the touch sensor 10 and the image-display body 2 and is made of a photo-curable resin.

6 Claims, 9 Drawing Sheets

(51) Int. Cl.
*G06F 3/044* (2006.01)
*G02F 1/1333* (2006.01)

(52) U.S. Cl.
CPC .. *G06F 3/044* (2013.01); *G02F 2001/133331* (2013.01); *G02F 2202/28* (2013.01); *G06F 2203/04103* (2013.01)

(56) References Cited

U.S. PATENT DOCUMENTS

| | | | | |
|---|---|---|---|---|
| 2002/0098444 A1* | 7/2002 | Sasaki | ................ | C08G 73/10 |
| | | | | 430/270.1 |
| 2006/0132011 A1* | 6/2006 | Shimizu | ................ | C09K 11/06 |
| | | | | 313/112 |
| 2008/0278456 A1 | 11/2008 | Huang | | |
| 2011/0063240 A1* | 3/2011 | Tanabe | ................ | G06F 3/044 |
| | | | | 345/173 |
| 2012/0062570 A1* | 3/2012 | Mignard | ............. | B81C 1/00047 |
| | | | | 345/501 |
| 2012/0228110 A1* | 9/2012 | Takahashi | ............... | G06F 3/044 |
| | | | | 200/600 |
| 2013/0122251 A1 | 5/2013 | Matsumoto et al. | | |
| 2014/0375912 A1* | 12/2014 | Gotoh | ................ | G06F 3/041 |
| | | | | 349/12 |
| 2015/0378477 A1* | 12/2015 | Yoshiki | ................ | G06F 3/044 |
| | | | | 345/174 |

FOREIGN PATENT DOCUMENTS

| | | |
|---|---|---|
| JP | 11-181384 A | 7/1999 |
| JP | 2003-114762 A | 4/2003 |
| JP | 2013-037207 A | 2/2013 |
| JP | 2013-122745 A | 6/2013 |
| WO | WO 2013/001996 A1 | 1/2013 |

OTHER PUBLICATIONS

Form PCT/ISA/237 for corresponding International Application No. PCT/JP2014/004142 dated Sep. 22, 2014.
Office Action dated Dec. 15, 2017 for corresponding Chinese Patent Application No. 201480046011.1 (English language translation).

* cited by examiner

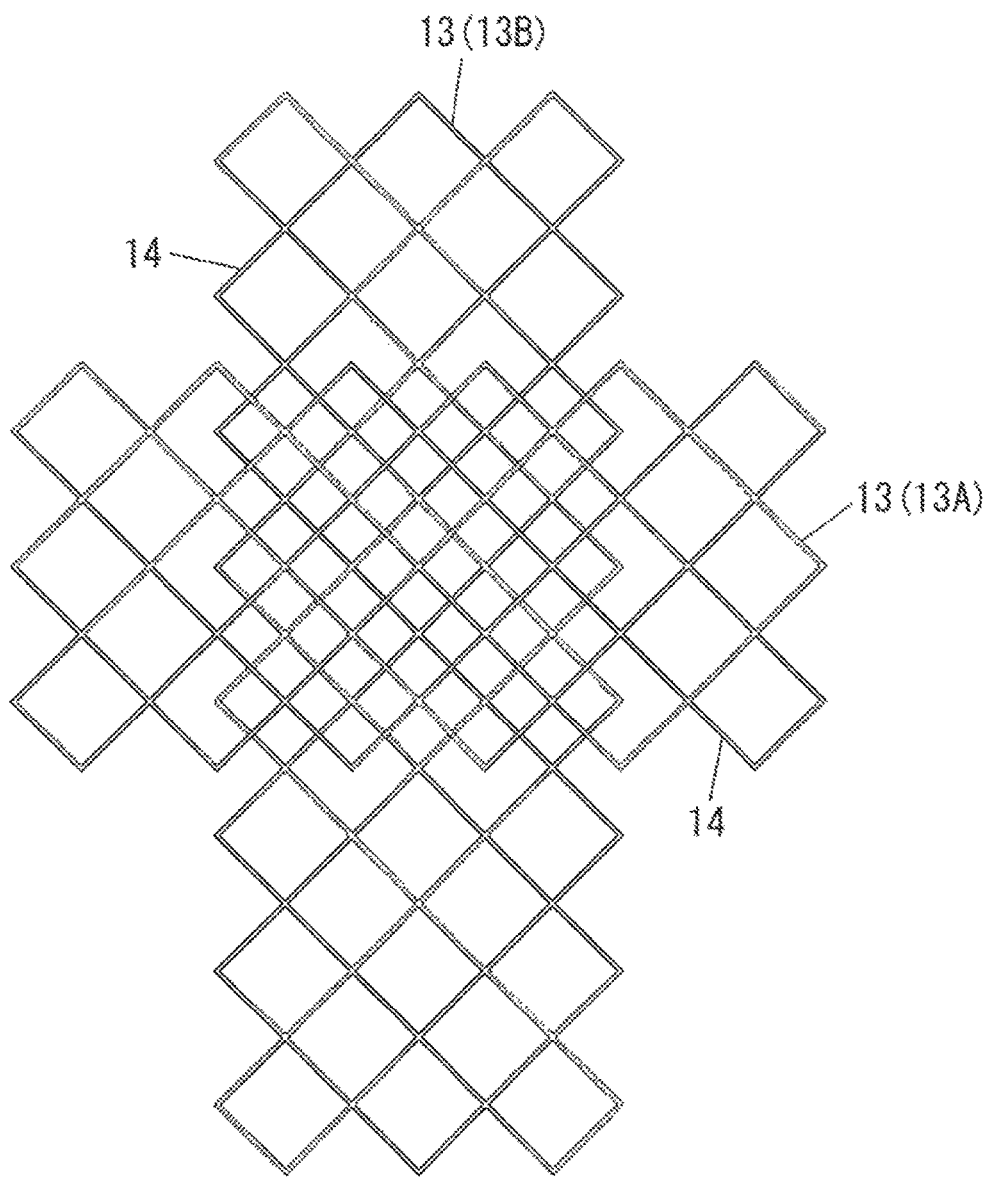

DISPLAY DEVICE WITH ADHESIVE LAYER AND RESIN LAYER AND MANUFACTURING METHOD THEREFOR

TECHNICAL FIELD

A touch-sensor-equipped display device and a manufacturing method therefor will be disclosed. Specifically, a display device including a touch sensor, a transparent substrate, and an image-display body will be disclosed.

BACKGROUND ART

Display devices in which a cover glass is placed on a front surface of a display panel are known. As a result of providing the cover glass, the display panel can be protected, and design of the display device can be improved.

In recent years, operability of display devices have been improved by attaching a touch sensor (refer to JP 2013-122745 A, for example). With the touch sensor, various processing such as changing a display image and activating application software can easily be performed on a screen with a finger or the like touching the screen, and therefore a display device having high operability can be obtained. A touch-sensor-equipped display device is also referred to as a touch panel.

In the touch sensor, normally, the position at an X coordinate and a Y coordinate of an object that has touched the screen is detected, and the input would be determined based on these coordinates. Examples of a detection method of X and Y coordinates include an electrostatic capacitance type method in which an electrode is to be attached to a back surface of the cover glass, an optical type method in which a camera is to be attached to a side of the cover glass, and the like. In the optical type detection method, a frame is provided that protrudes forward farther than the cover glass in a periphery of the cover glass, and a small camera is embedded in a side portion of the frame. Therefore, since the frame protrudes farther than the cover glass, it is difficult to obtain a flat display device. On the other hand, in the electrostatic capacitance type detection method, the electrode needs only to be attached to the back surface of the cover glass and the frame does not need to protrude, and a display device having a flat surface can be easily obtained. In recent years, in touch-sensor-equipped display devices, a device that is thin and well designed is preferred, and in this case the electrostatic capacitance type method is advantageous.

In the electrostatic capacitance type touch sensor, a plurality of planar members are required to be disposed with high positional accuracy. For example, a touch sensor can be configured by laminating an electrode layer for detecting an X coordinate and an electrode layer for detecting a Y coordinate, and it is important that these electrode layers are overlaid, as much as possible, without any positional displacement. When the electrode layers are displaced, an accurate detection may not be performed. Also, the touch sensor is fixed by being bonded to the cover glass, and it is also important that the attachment position between the cover glass and the touch sensor does not include any positional displacement as much as possible. Also, because an input in the touch sensor is performed by an operator who has viewed the display in the display panel and follows the display, it is also important that the relative position between the touch sensor and the display panel does not include any positional displacement as much as possible.

A method in which a transparent adhesive tape that expresses adhesiveness on both sides thereof is used to bond members together in the touch-sensor-equipped display device is known. The members can be easily bonded together by using the adhesive tape. However, the method in which the adhesive tape is used requires that the members are overlaid while accurately aligning positions on a surface having adhesiveness, and because re-bonding normally cannot be performed, bonding together with high positional accuracy becomes difficult, specifically when the display area of the device increases.

SUMMARY OF INVENTION

An object of the present disclosure is to provide a touch-sensor-equipped display device in which members are disposed with high positional accuracy and has superior detectability. An object of the present disclosure is to manufacture a touch-sensor-equipped display device in which members can be easily disposed with high positional accuracy and that has superior detectability.

A touch-sensor-equipped display device will be disclosed. The touch-sensor-equipped display device includes a touch sensor, a transparent substrate, an image-display body, an adhesive layer formed of a thermal adhesive film, and a resin layer. The touch sensor includes a first conductive layer composed of a plurality of first electric conductors, a second conductive layer composed of a plurality of second electric conductors, and at least one support film. The plurality of first electric conductors are arranged in parallel. The plurality of first electric conductors extend in a belt like manner. The plurality of second electric conductors are arranged in parallel. The plurality of second electric conductors extend in a belt like manner in a direction that is different from the direction in which the plurality of the first electric conductors extend. The transparent substrate supports the touch sensor. The image-display body is disposed on an opposite side of the touch sensor from the transparent substrate. The thermal adhesive film bonds the at least one support film and the transparent substrate. The resin layer is disposed between the touch sensor and the image-display body. The resin layer is made of a photo-curable resin.

A touch-sensor-equipped display device manufacturing method will be disclosed. The touch-sensor-equipped display device manufacturing method includes a support film disposition step, a bonding step, and a resin curing step. In the support film disposition step, at least one support film that supports a first conductive layer and a second conductive layer is disposed on a transparent substrate with a thermal adhesive film being located between the support film and the transparent substrate in an overlaid manner. The first conductive layer is composed of a plurality of first electric conductors. The second conductive layer is composed of a plurality of second electric conductors. The plurality of first electric conductors are arranged in parallel. The plurality of first electric conductors extend in a belt like manner. The plurality of second electric conductors are arranged in parallel. The plurality of second electric conductors extend in a belt like manner in a direction that is different from the direction in which the plurality of the first electric conductors extend. In the bonding step, the transparent substrate and the at least one support film are bonded by heating and pressurization. In the resin curing step, the transparent substrate and an image-display body are overlaid with a photo-curable resin located between the transparent substrate and the image-display body, and the photo-curable resin is cured by being provided with light from a transparent substrate side.

The touch-sensor-equipped display device that will be disclosed is a device in which the members are disposed with high positional accuracy as a result of bonding with a thermal adhesive film and that has superior detectability.

BRIEF DESCRIPTION OF DRAWINGS

FIG. 1A is a cross-sectional view, FIG. 1B is a plan view, and FIG. 1C is an enlarged cross-sectional view;

FIG. 2A illustrates a first electric conductor, and FIG. 2B illustrates a second electric conductor;

FIG. 3 is a plan view illustrating an example of an overlaid pattern of electric conductors;

FIG. 4A illustrates an example of a device including a resin layer, and FIG. 4B is an example of a device not including a resin layer;

DESCRIPTION OF EMBODIMENTS

Figure 1A:
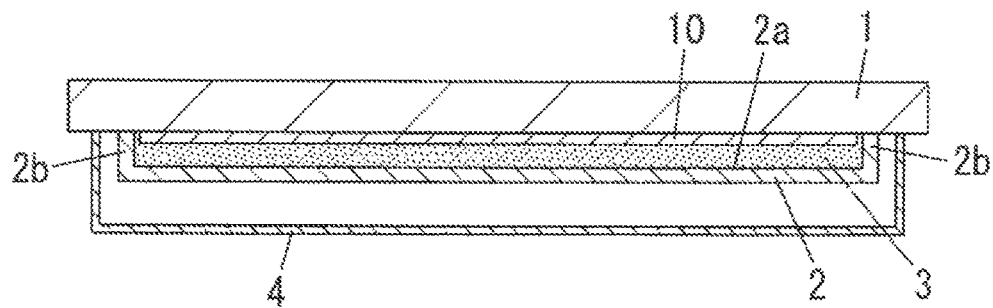
FIGS. 1A to 1C illustrate an example of a touch-sensor-equipped display device.

A touch-sensor-equipped display device will be disclosed. The touch-sensor-equipped display device includes a touch sensor 10, a transparent substrate 1 that supports the touch sensor 10, an image-display body 2 that is disposed on an opposite side of the touch sensor 10 from the transparent substrate 1, an adhesive layer formed of a thermal adhesive film 5, and a resin layer 3. The touch sensor 10 includes a first conductive layer 12A, a second conductive layer 12B, and at least one support film 11. The first conductive layer 12A is composed of a plurality of first electric conductors 13A. The second conductive layer 12B is composed of a plurality of second electric conductors 13B. The plurality of first electric conductors 13A are arranged in parallel. The plurality of first electric conductors 13A extend in a belt like manner. The plurality of second electric conductors 13B are arranged in parallel. The plurality of second electric conductors 13B extend in a belt like manner in a direction that is different from a direction in which the plurality of first electric conductors 13A extend. The thermal adhesive film 5 bonds at least one support film 11 and the transparent substrate 1. The resin layer 3 is disposed between the touch sensor 10 and the image-display body 2. The resin layer 3 is made of a photo-curable resin.

In the touch-sensor-equipped display device, as a result of the support film 11 being bonded to the transparent substrate 1 by the thermal adhesive film 5, the members thereof can be disposed with high positional accuracy. Accordingly, a touch-sensor-equipped display device that is superior in position detectability can be obtained. Also, as a result of the resin layer 3 being provided, double reflection of an image is suppressed, and a touch-sensor-equipped display device that has superior visibility can be obtained.

Figure 1B:
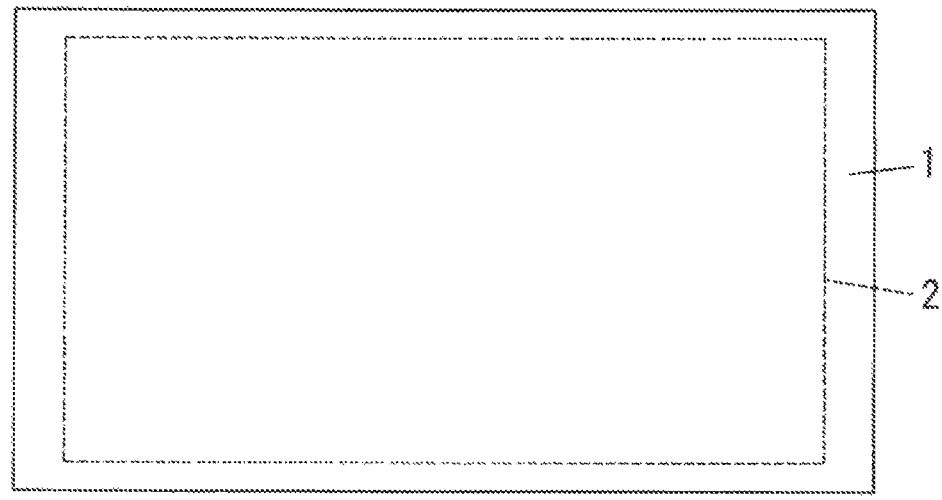
Figure 1C:
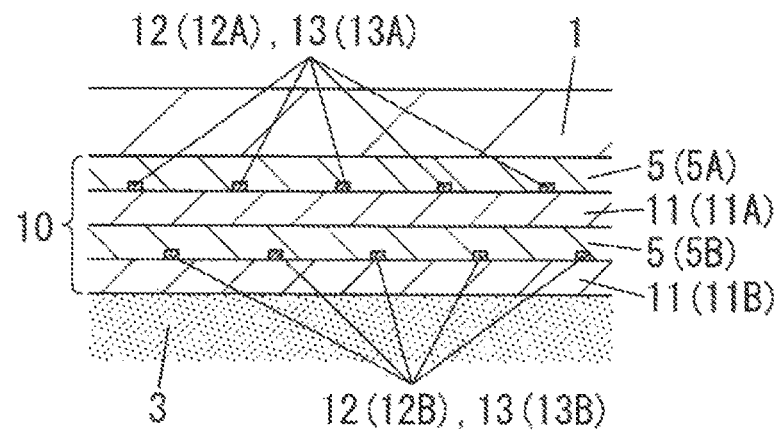

FIGS. 1A to 1C show an example of the touch-sensor-equipped display device. FIG. 1A shows a cross-sectional view of the entire touch-sensor-equipped display device. Note that, in this diagram, details of the touch sensor 10 are omitted. FIG. 1B is a plan view of the touch-sensor-equipped display device when viewed from a transparent substrate 1 side in a direction vertical to a surface of the transparent substrate 1. FIG. 1C is an enlarged view of a portion in the vicinity of the touch sensor 10 in the touch-sensor-equipped display device. Note that, in these diagrams, the thicknesses of the layers and the sizes of the members are appropriately changed so as to make the device configuration easy to understand. In an actual device, the thicknesses and the sizes may be different from those of the diagram. The same applies to the subsequent diagrams.

The transparent substrate 1 can be composed of a transparent planar substrate. The transparent substrate 1 may have a plate-like, film-like, or sheet-like shape. The touch sensor 10 and the image-display body 2 can be protected by using the transparent substrate 1. Also, the touch sensor 10 can be reliably supported by using the transparent substrate 1. Glass is preferably used as the transparent substrate 1. As a result of the transparent substrate 1 being made of glass, transparency can be improved, and thus visibility of an image display can be improved, and also the image-display body 2 and the touch sensor 10 can be favorably protected. In the case where the transparent substrate 1 is made of glass, the transparent substrate 1 is a so-called cover glass. A preferable mode of the transparent substrate 1 is a glass plate. The transparent substrate 1 may be made of resin. Note that in the case where the transparent substrate 1 is made of resin, resin having high hardness and transparency is preferable. For example, the transparent substrate 1 can be made of polycarbonate. Note that a protection layer may be provided on the outside surface of the transparent substrate 1. With the protection layer, protection performance is improved and scratching of the surface of the transparent substrate 1 can be suppressed. The protection layer can be made of a resin film or the like.

The image-display body 2 is a device having a function of displaying an image. The image-display body 2 functions as a display panel. The image-display body 2 displays a planar image. An image displayed on the image-display body 2 can be viewed from the outside through the touch sensor 10 and the transparent substrate 1. A surface of the image-display body 2 on a transparent substrate 1 side is an image display surface. The image-display body 2 includes a display portion that performs image display. The display portion may be composed of a liquid crystal display, an LED display, an organic EL display, a plasma display, or the like. The display portion is provided such that an image is displayed on the image display surface. In FIG. 1B, an outer edge of the image-display body 2 is shown by broken lines, and a manner in which the image-display body 2 can be viewed through the transparent substrate 1, the touch sensor 10, and the resin layer 3 that are transparent members is illustrated.

In the example shown in FIG. 1A, the image-display body 2 is provided with a frame portion 2b that projects from a periphery thereof toward the transparent substrate 1. The frame portion 2b may be provided expanding the entire periphery of the image-display body 2. As a result of providing the frame portion 2b, a recess 2a is formed in the image-display body 2. As a result of providing the recess 2a, resin can easily fill the space between the image-display body 2 and the touch sensor 10. Also, the touch sensor 10 can be housed in the recess 2a. In this case, the frame portion 2b functions as a spacer. The frame portion 2b may be composed of an appropriate member such as a resin molded body. The frame portion 2b may be joined to the transparent substrate 1 at an end portion thereof. The image display surface is formed of a bottom surface of the recess 2a.

The image-display body 2 is preferably provided with a back light structure. A back light has a function of emitting light toward the display portion. The light from the back light is emitted to the outside through the display portion composed of a liquid crystal display (LCD) or the like. As a result of providing the back light, an image shown in the image-display body 2 can be displayed more brightly to the outside. The back light structure may be formed of a stacked structure in which a light portion composed of an LED or the like, a light guide plate, an LCD, a color filter, and a polarizing plate are stacked from the back surface in the stated order, for example.

In the example shown in FIG. 1A, the touch sensor 10 and the image-display body 2 are housed in a casing 4 that is joined to a periphery portion of the transparent substrate 1. The members housed inside the casing 4 such as the image-display body 2 and the touch sensor 10 can be protected by the casing 4. A controller configured to control the image display, a detector configured to detect a touched position from a change in electrostatic capacitance in the touch sensor 10, and the like may be provided in a housing portion of the casing 4.

The touch sensor 10 includes a structure in which the electrostatic capacitance of a touched portion changes when a touch material such as a finger or a touch pen touches on the transparent substrate 1, and the change in the electrostatic capacitance can be transmitted as an electrical signal. The position of the touched portion can be detected in the touch-sensor-equipped display device based on the electrical signal transmitted from the touch sensor 10. The touch sensor 10 is an electrostatic capacitance type sensor. The electrostatic capacitance type sensor can form a flat display surface. The position of the touched portion can be obtained, normally, as coordinates. For example, an X coordinate axis and a Y coordinate axis are set as coordinate axes that intersect, and the touched position can be detected as numeric values of the X coordinate and Y coordinate.

Figure 2A:
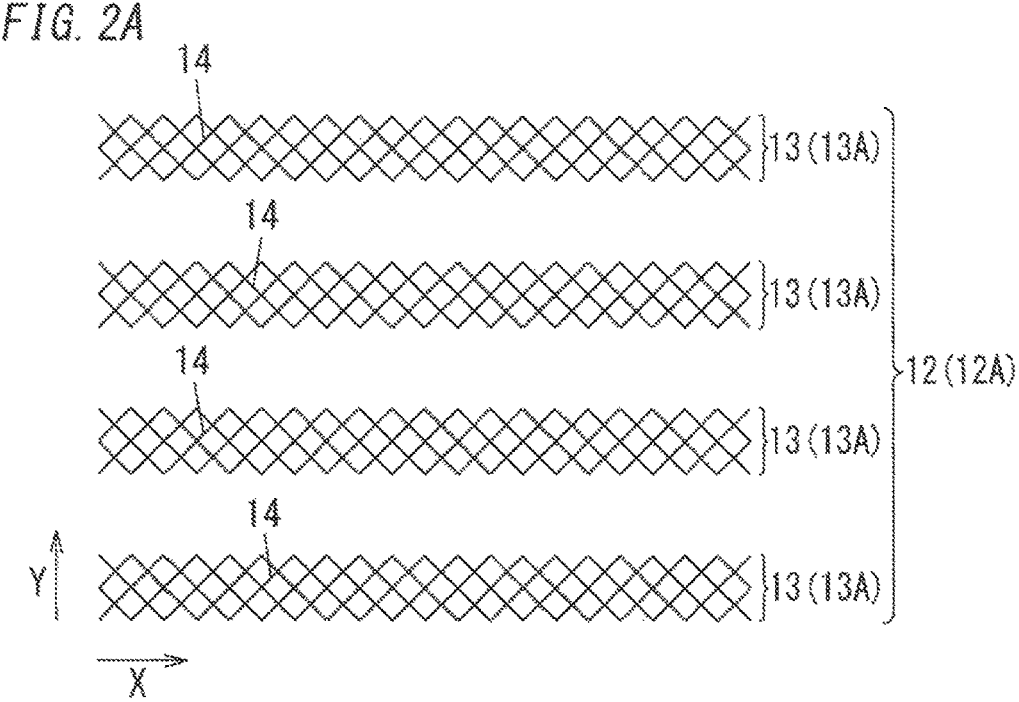
FIGS. 2A and 2B are plan views illustrating an example of an electric conductor pattern.
Figure 2B:
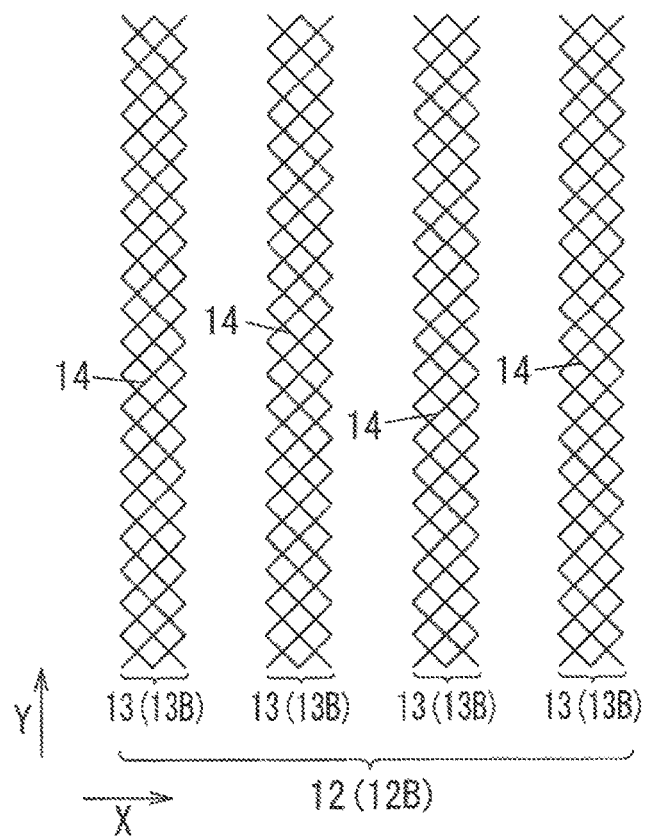

FIGS. 2A and 2B show an example of a conductive layer 12 pattern in the touch sensor 10. The touch sensor 10 includes two conductive layers 12. FIG. 2A shows an example of the first conductive layer 12A, and FIG. 2B shown an example of the second conductive layer 12B. In the diagrams, the conductive layers 12 are shown in an enlarged manner, and a large number of electric conductors 13 constitute each of the conductive layers 12 as a whole.

In each of the conductive layers 12, a plurality of electric conductors 13 that extend in a belt like manner are formed in parallel. The plurality of electric conductors 13 are preferably arranged in parallel at equal intervals. The electric conductors 13 in one conductive layer 12 extend in a direction different from the extending direction of the electric conductors 13 in the other conductive layer 12. The extending directions of the electric conductors 13 are preferably orthogonal to each other. The electric conductors 13 each preferably extend linearly. The electric conductors 13 extend in a horizontal direction in FIG. 2A, and the electric conductors 13 extend in a vertical direction in FIG. 2B, and therefore the extending directions of the electric conductors 13 are orthogonal to each other when the two layers are overlaid. The electric conductors 13 are formed like a belt having a predetermined width.

In the touch sensor 10, the two conductive layers 12 can function as a pair of electrodes. A voltage can be applied to each of the electrodes. The electrostatic capacitance between the electrodes is maintained at a predetermined value in a normal state. When the touch material such as a finger or a touch pen touches the outer surface of the transparent substrate 1, the electrostatic capacitance at the touched portion changes according to the touch, and an output signal is outputted from the two electrodes. Here, since the two conductive layers 12 that constitute the electrodes are formed by the electric conductors 13 that extend in orthogonal directions, the X coordinate can be detected from one of the two conductive layers 12 and the Y coordinate can be detected from the other of the two conductive layers 12. Thus, the position of the touched portion can be detected in plane coordinates by the two conductive layers 12. Accordingly, as a result of detecting the output signal, the position touched by the touch material can be detected.

One of two conductive layers 12 provided in the touch sensor 10 is defined as a first conductive layer 12A and the other is defined as a second conductive layer 12B. The first conductive layer 12A is the conductive layer 12 on the transparent substrate 1 side, and the second conductive layer 12B is the conductive layer 12 on a resin layer 3 side. The first conductive layer 12A includes the plurality of first electric conductors 13A. The second conductive layer 12B includes the plurality of second electric conductors 13B. The first conductive layer 12A is composed of the plurality of first electric conductors 13A that are arranged in parallel and extend in a belt like manner. The second conductive layer 12B is composed of the plurality of second electric conductor 13B that are arranged in parallel and extend in a belt like manner. The first electric conductors 13A extend in a direction that is different from the direction in which the second electric conductors 13B extend. The two directions are preferably orthogonal to each other.

The conductive layers 12 are supported by the support films 11. The conductive layers 12 are formed on the respective support films 11. Accordingly, the plurality of electric conductors 13 can be easily arranged at equal intervals, and the conductive layers 12 that enable highly accurate detection can be configured.

In the example shown in FIG. 1C, the touch sensor 10 includes a first support film 11A and a second support film 11B as the support films 11. The first support film 11A is a substrate for supporting the first conductive layer 12A. The second support film 11B is a substrate for supporting the second conductive layer 12B.

The support films 11 may be made of an electric insulating material. The support films 11 may be made of resin films, for example. The support films 11 can be formed of polyethylene terephthalate (PET), for example. The support films 11 are preferably transparent.

Here, in FIGS. 2A and 2B, the horizontal direction is defined as an X-axis direction, and the vertical direction is defined as a Y-axis direction. The first conductive layer 12A is formed by the plurality of electric conductors 13 (first electric conductors 13A) that extend in the X-axis direction, as shown in FIG. 2A. The plurality of first electric conductors 13A are arranged in parallel at equal intervals in the Y-axis direction. Also, the second conductive layer 12B is formed by the plurality of electric conductors 13 (second electric conductors 13B) that extend in the Y-axis direction, as shown in FIG. 2B. The plurality of second electric conductors 13B are arranged in parallel at equal intervals in the X-axis direction. The electric conductors 13 are formed on the corresponding support films 11. The electric conductors 13 may be formed to extend from one end portion to the other end portion of the support film 11. Of course, an electric conductor collection portion in which electric conductors that are electrically connected to the electric conductors 13 are collected may be formed in the support film 11 in an end portion thereof. In this case, a connection structure of electric conductors can be easily formed. Note that it is sufficient that the electric conductors 13 in the two conductive layers 12 are formed such that the electric conductors 13 in one conductive layer 12 extend along the X-axis, and the electric conductors 13 in the other conductive layer 12 extend along the Y-axis. Of course the configuration may be such that the first electric conductors 13A extend in the Y-axis direction and the second electric conductors 13B extend in the X-axis direction.

In the conductive layers 12, adjacent electric conductors 13 are arranged at predetermined intervals. Light can pass through portions between adjacent electric conductors 13. Therefore, an image can be displayed through spaces between the electric conductors 13. Note that the electric conductors 13 may be opaque or transparent. In the case where the electric conductors 13 are formed of metal or the like in order to reduce electrical resistance, normally, the electric conductors 13 are opaque.

The electric conductors 13 are formed like a belt having a predetermined width. As shown in FIGS. 2A and 2B, the pattern of the first electric conductors 13A and the second electric conductors 13B is preferably formed in a shape such that light can pass therethrough. In the examples shown in FIGS. 2A and 2B, each of the electric conductors 13 is formed in a mesh-like shape by thin lines 14 made of a conductive material. Therefore, light can pass through spaces in the mesh. A large number of holes may be provided in each of the electric conductors 13. The electric conductors 13 take a belt like shape due to a plurality of thin lines 14 being connected together. Each of the electric conductors 13 is formed by a lattice-like pattern in which a plurality of quadrangles having the same shape are arranged. The quadrangles are preferably squares. In each of the electric conductors 13, the plurality of quadrangles that form the mesh are continuously arranged such that a diagonal line of each of the quadrangle extends in a direction in which the electric conductor 13 extends. As a result of the electric conductors 13 being formed such that light can pass therethrough, an image can be displayed through spaces of the mesh or the like of the electric conductors 13 to the outside, and therefore the visibility of the image can be improved.

The thin lines 14 are arranged preferably in lines. Each width of the thin lines 14 can be 1 to 10 μm, for example, but is not limited thereto. Each width of the electric conductors 13 can be 0.1 to 100 mm, for example, but is not limited thereto.

The thin lines 14 that constitute the electric conductors 13 are formed of an appropriate conductive material. For example, the thin lines 14 are preferably made of metal, specifically copper, gold, silver, platinum, aluminum, chromium, nickel, or the like. The conductive material of the thin lines 14 is more preferably copper. As a result of using copper, the electric conductors 13 having high pattern accuracy that achieves favorable detection sensitivity can be formed. Note that although the material that makes the first conductive layer 12A may be different from the material that makes the second conductive layer 12B, it is more preferable that the materials are the same. Accordingly, a touch panel having high detectability can be obtained. Also, when the materials of the two conductive layers 12 are the same, manufacturing is more simplified. Note that each of the electric conductors 13 may be configured by a stacked structure of copper and another metal. The metal to be stacked with copper may be a metal described above. Incidentally, the surface of the metal that makes the thin lines 14 may be nitrided to form metal nitride. In the case of copper, copper nitride is formed by nitriding the surface of the copper. The color of the copper becomes black due to nitridization. As a result of making the surface black, the surface of the touch panel is unlikely to reflect light. Accordingly, visibility can be improved.

The first conductive layer 12A shown in FIG. 2A and the second conductive layer 12B shown in FIG. 2B are overlaid in the perpendicular direction, and as a result, a detection structure of the touch sensor 10 is formed.

FIG. 3 shows a manner in which two conductive layers 12 (the first conductive layer 12A and the second conductive layer 12B) are overlaid, and a portion in which one of the first electric conductors 13A and one of the second electric conductors 13B overlap is enlarged. As shown in FIG. 3, when viewed in a direction perpendicular to the display surface (in the case of planar view), the two electric conductors 13 that are arranged in the perpendicular direction are arranged so as to intersect at a right angle. Here, as shown in FIG. 3, it is preferable that the thin lines 14 that form the electric conductors 13 do not linearly overlap in the vertical direction, and the patterns of the thin lines 14 of the respective layers are shifted. In this example, latticed thin lines 14 that form the second electric conductors 13B are each arranged between latticed thin lines 14 that form the first electric conductors 13A in the overlapped portion, and as a result, a mesh pattern configured by the thin lines 14 is shifted. As a result of the patterns of the thin lines 14 that configure the two electric conductors 13 being shifted, the sensitivity in detecting change in the electrostatic capacitance can be improved. FIG. 1C shows an intersected portion between the electric conductors 13, and the shift between the thin lines 14 can be seen.

In the touch-sensor-equipped display device, one or a plurality of support films 11 and the transparent substrate 1 are bonded by the thermal adhesive films 5. As shown in FIG. 1C, the first support film 11A and the transparent substrate 1 are bonded by the thermal adhesive film 5. The thermal adhesive film 5 disposed between the transparent substrate 1 and the first support film 11A is defined as a first thermal adhesive film 5A. Also, in the example shown in FIG. 1C, the first support film 11A and the second support film 11B are bonded by the thermal adhesive film 5. The thermal adhesive film 5 disposed between the first support film 11A and the second support film 11B is defined as a second thermal adhesive film 5B. Each of the thermal adhesive films 5 forms a layer of the thermal adhesive film 5 after bonding. The layer of the thermal adhesive film 5 may be a layer formed of the thermal adhesive film 5 that is, after being heated to be softened and express adhesiveness, cooled to be hardened. The layer of the thermal adhesive film 5 is defined as an adhesive layer. The adhesive layer formed of the first thermal adhesive film 5A is disposed between the transparent substrate 1 and the first support film 11A. The adhesive layer formed of the second thermal adhesive film 5B is disposed between the first support film 11A and the second support film 11B.

The thermal adhesive films 5 are made of a film material that expresses adhesiveness due to being heated. Each of the thermal adhesive films 5 is a film-like molded body. The thermal adhesive films 5 do not have adhesiveness before being heated (before use). The thermal adhesive films 5 are softened by being heated and express adhesiveness. The thermal adhesive films 5 may be melted when heated. The adhesive layers are formed of the thermal adhesive films 5. The thermal adhesive films 5 can be made of a thermoplastics resin film, for example. Also, the thermal adhesive films 5 can be made of a film that is made of an addition polymerizable monomer or resin. As a result of using the thermal adhesive films 5, alignment between the first support film 11A and the second support film 11B can be easily performed with high accuracy. Accordingly, positions of the first conductive layer 12A and the second conductive layer 12B can be adjusted with high accuracy. As a result, the touch sensor 10 having high detectability can be constructed. Also, as a result of using the thermal adhesive films 5, the touch sensor 10 can be formed on the transparent substrate 1 with high positional accuracy. Note that although the state of the thermal adhesive films 5 after being heated may be different from the state before being heated, the adhesive layers formed of the respective thermal adhesive films 5 are given the reference numeral 5 in the diagram to facilitate understanding. Accordingly, the adhesive layers formed of the respective thermal adhesive films 5 may be understood as "adhesive layers 5".

Here, in a display device having a large screen, there are cases in which bonding members together with high positional accuracy is difficult. For example, when the size of a display screen is 50 inches or more, or furthermore is 70 inches or more, it is not easy to perform bonding with high positional accuracy. It is conceivable that the bonding of the members is performed with an optical clear adhesive (OCA) tape. However, the optical clear adhesive tape has adhesiveness in a normal state. Therefore, when the optical clear adhesive is used, re-bonding cannot be performed, positional displacement is likely to occur, and the positional displacement cannot be corrected when positional displacement has occurred. On the other hand, by using the thermal adhesive films 5, after the members are aligned and overlaid in a state in which the thermal adhesive films 5 do not express adhesiveness, the members can be bonded by the thermal adhesive films 5 being heated. Accordingly, alignment can be performed easily with high accuracy. As a result, a touch-sensor-equipped display device having high position detectability can be obtained. Also, even in a large screen whose short side length is 0.5 m or more, or is 1 m or more in a rectangle screen, alignment of the members can be easily performed. In a square screen, length of one side may be 0.5 m or more, or may be 1 m or more. Note that although the upper limit of the size of a screen is not specifically limited, length of one side may be 3 m or less, or may be 2 m or less in a rectangular or square screen, for example. Note that the shape of the screen of the touch-sensor-equipped display device is not limited to a quadrangle, and may be another polygon (such as a triangle, a hexagon, or an octagon), a circle, an ellipse, or the like.

The thermal adhesive films 5 express adhesiveness due to softening with heat. Therefore, the electric conductors 13 that form the conductive layers 12 are embedded in the respective layers of the thermal adhesive films 5, as shown in FIG. 1C. The thermal adhesive films 5 may be electrically insulative. The thermal adhesive films 5 preferably become transparent after being heated. That is, the adhesive layers formed of the thermal adhesive films 5 are preferably transparent. Accordingly, an image can be displayed to the outside. The thermal adhesive films 5 may not be completely transparent before being heated. However, the thermal adhesive films 5 preferably have optical transparency to such a degree that an outline of an object that is disposed on an opposite side of the film can be seen therethrough. Accordingly, alignment can be performed easily.

The resin layer 3 is provided between the touch sensor 10 and the image-display body 2. The resin layer 3 is made of resin that fills the space between the touch sensor 10 and the image-display body 2. As a result of the resin layer 3 being provided between the image-display body 2 and the transparent substrate 1, double reflection of an image can be suppressed, and thus image display with superior visibility can be performed.

Figure 4A:
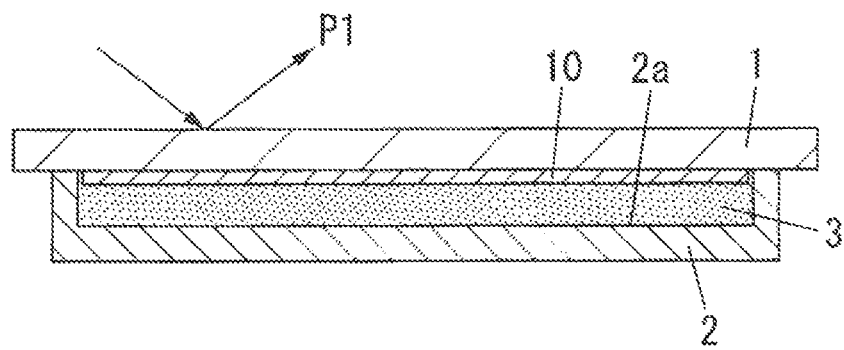
FIGS. 4A and 4B are cross-sectional views for illustrating reflection in the touch-sensor-equipped display device.
Figure 4B:
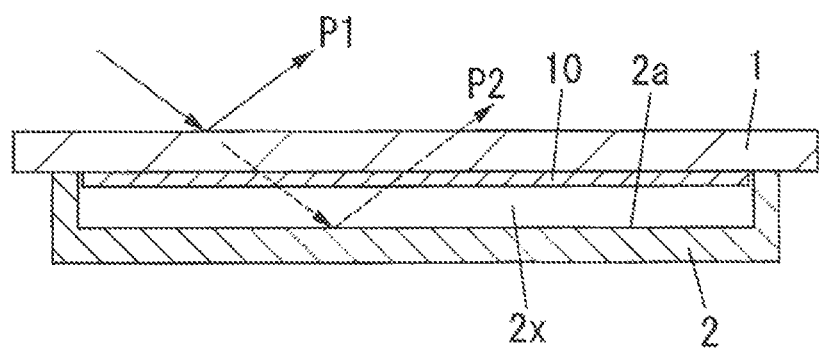

The mechanism of double reflection of an image and suppression thereof in a display device will be described with reference to FIGS. 4A and 4B. The double reflection of an image is caused by the mixture of surface reflection occurring on a surface of the transparent substrate 1 (cover glass, for example) and secondary reflection occurring on a surface of the image-display body 2 (display panel, for example). In a configuration shown in FIG. 4B, resin does not fill the space between the transparent substrate 1 and the image-display body 2, and the resin layer 3 is not formed. Accordingly, the space forms a hollow space 2x. In this case, light propagating toward the transparent substrate 1 from the outside becomes light P1 due to surface reflection that is reflected off the surface of the transparent substrate 1 and propagates toward the outside, and light P2 due to secondary reflection that is reflected off the surface of the image-display body 2 and propagates toward the outside. Due to the existence of the light P1 and light P2, double reflection of an image occurs. If the resin layer 3 is provided between the transparent substrate 1 and the image-display body 2, as shown in FIG. 4A, the refractive index of a medium that fills the space between the transparent substrate 1 and the image-display body 2 becomes close to that of the transparent substrate 1. Accordingly, the secondary reflection is suppressed and the light P2 almost disappears, and the light P1 due to the surface reflection becomes dominant as the reflected light. As a result, generation of two or more reflections of light is suppressed and the double reflection of an image can be reduced.

The resin layer 3 is made of a photo-curable resin. The resin layer 3 can be easily formed by causing the photo-curable resin to be cured. The photo-curable resin is preferably resin having fluidity. In a preferable mode, the photo-curable resin is cured by an addition reaction. It is preferable that the photo-curable resin does not generate volatile components or low molecular weight components such as water and a low molecular weight alcohol at the time of being cured. The photo-curable resin whose volume changes before and after curing is smaller is more preferable. The filling ability by the resin layer 3 can be improved. The photo-curable resin is preferably an ultraviolet curable resin.

The resin layer 3 can be formed by filling the space between the transparent substrate 1 and the image-display body 2 with a photo-curable resin and providing the photo-curable resin with light from a transparent substrate 1 side.

The transparent substrate 1 and the touch sensor 10 preferably transmit light of a wavelength that causes the photo-curable resin to be cured. The adhesive layers formed of the thermal adhesive films 5 preferably transmits light of a wavelength that causes the photo-curable resin to be cured. The resin layer 3 is preferably made of an adhesive resin. Accordingly, the image-display body 2 and the transparent substrate 1 can be strongly bonded. Of course, if the frame portion 2b of the image-display body 2 and the transparent substrate 1 are sufficiently fixed together, the resin layer 3 need not have adhesiveness.

Next, a manufacturing method of the touch-sensor-equipped display device will be described.

The manufacturing method of the touch-sensor-equipped display device includes a support film disposition step, a bonding step, and a resin curing step. The support film disposition step is a step in which at least one support film 11 that supports the first conductive layer 12A and the second conductive layer 12B is overlaid and disposed on the transparent substrate 1 such that the thermal adhesive film 5 is interposed between the support film 11 and the transparent substrate 1. The first conductive layer 12A is composed of the plurality of first electric conductors 13A. The second conductive layer 12B is composed of the plurality of second electric conductors 13B. The plurality of first electric conductors 13A are arranged in parallel. The plurality of first electric conductors 13A extend in a belt like manner. The plurality of second electric conductors 13B are arranged in parallel. The plurality of second electric conductors 13B extend in a belt like manner in a direction that is different from the direction in which the plurality of first electric conductors 13A extend. The bonding step is a step in which the transparent substrate 1 and the support film 11 are bonded by heating and pressurization. The resin curing step is a step in which the transparent substrate 1 and the image-display body 2 are overlaid such that the photo-curable resin is located therebetween, and the photo-curable resin is cured by being provided with light from the transparent substrate 1 side.

In the manufacturing method of the touch-sensor-equipped display device, as a result of the support film 11 and the transparent substrate 1 being bonded using the thermal adhesive film 5, the members are disposed with high positional accuracy. Accordingly, a touch-sensor-equipped display device that is superior in position detectability can be manufactured. Also, as a result of providing the resin layer 3, the double reflection of an image can be suppressed, and a touch-sensor-equipped display device that is superior in visibility can be manufactured.

Figure 5A:
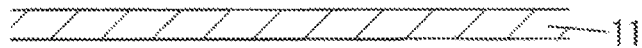
FIGS. 5A to 5F illustrate an example of a manufacturing method of the touch-sensor-equipped display device, and are cross-sectional views illustrating a manner in which the touch sensor is manufactured.
Figure 5B:
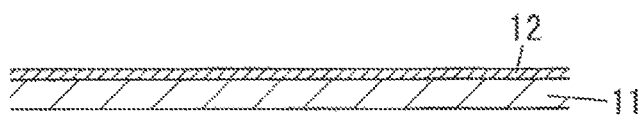
Figure 5C:
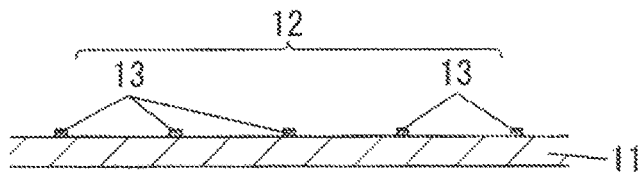
Figure 5D:
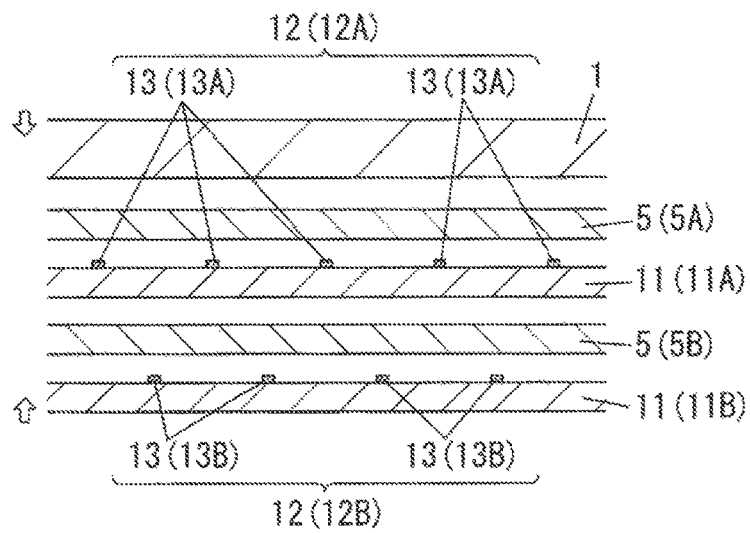
Figure 5E:
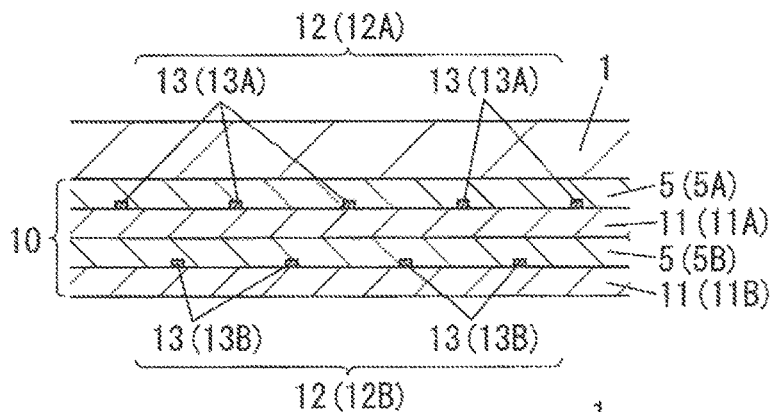

FIGS. 5A to 5F show an example of the manufacturing method of the touch-sensor-equipped display device, and a manner in which the touch sensor 10 is manufactured is illustrated. FIGS. 5D and 5E, of FIGS. 5A to 5F, show the support film disposition step and the bonding step.

When the touch sensor 10 is to be manufactured, first, the support film 11 is prepared, as shown in FIG. 5A. A transparent resin film can be used as the support film 11, and a PET film can be used, for example. The support film 11 having a thickness of 10 to 1000 μm can be used, but is not limited thereto. By adjusting the thickness of the support film 11, the electrostatic capacitance can be adjusted.

Next, as shown in FIGS. 5B and 5C, the conductive layer 12 is formed on the support film 11. In this example, a method is illustrated in which a material for the conductive layer 12 is laminated for the entire surface of the support film 11 in layers, as shown in FIG. 5B, and thereafter the electric conductors 13 having a predetermined pattern is formed by removing portions of the material of the conductive layer 12 by etching to form the pattern, as shown in FIG. 5C. As a result of forming the electric conductors 13 by etching, the conductive layers 12 can be formed with high pattern accuracy. The electric conductors 13 composed of the thin lines 14 having a width of 1 to 10 μm and a height of 1 to 10 μm can be formed. The formation of the conductive layers 12 can be performed by an appropriate method such as lamination of a metallic foil, sputtering, vapor deposition, or plating. Among these, using metallic foil is preferable because the conductive layer 12 can be easily formed. A copper foil can be used as the metallic foil, for example. The bonding between the metallic foil and the support film 11 can be performed by using an optical clear adhesive, for example. Also, a metallic foil on which an adhesive is attached may be bonded to the support film 11. In the case where the thickness of the conductive layers 12 is approximately up to 5 μm, a film formation by vapor deposition or sputtering may be effective. On the other hand, in the case where the thickness of the conductive layers 12 is 5 μm or more, bonding of a copper foil by an adhesive medium may be effective. The etching can be performed by photo etching, for example. The pattern of the conductive layer 12 may be a pattern in which a plurality of electric conductors 13 having a mesh-like shape are arranged in parallel as described above.

Two support films 11 including the respective patterned conductive layers 12 in this way are prepared. One of the two conductive layers 12 will be the first conductive layer 12A, and the other will be the second conductive layer 12B. Here, the first electric conductors 13A that constitute the first conductive layer 12A and the second electric conductors 13B that constitute the second conductive layer 12B are provided in patterns such that, when the support films 11 are overlaid, the direction in which the first electric conductors 13A extend is different from the direction in which the second electric conductors 13B extend. The first conductive layer 12A and the second conductive layer 12B may have the same mode other than that, and the support films 11 that supports the respective first conductive layer 12A and the second conductive layer 12B may have the same mode. Note that when the patterns of the conductive layers 12 are formed, electric conductor collection portions may be provided in an end portion of the respective support films 11.

Next, as shown in FIG. 5D, the transparent substrate 1, first support film 11A, and the second support film 11B are overlaid in the stated order. At that time, the thermal adhesive film 5 (first thermal adhesive film 5A) is located between the transparent substrate 1 and the first support film 11A. Also, the thermal adhesive film 5 (second thermal adhesive film 5B) is located between the first support film 11A and the second support film 11B. The support film 11 is preferably disposed such that a surface thereof on which the conductive layer 12 is provided is on the transparent substrate 1 side. Accordingly, the first thermal adhesive film 5A, the first support film 11A having the first conductive layer 12A, the second thermal adhesive film 5B, and the second support film 11B having the second conductive layer 12B are overlaid on the surface of the transparent substrate 1 in the stated order from the transparent substrate 1 side. The thickness of the thermal adhesive films 5 may be 10 to 1000 μm, but is not limited thereto. The first thermal adhesive film 5A and the second thermal adhesive film 5B may have the same thickness, or may have different thicknesses. However, manufacturing may be easier when the thicknesses are the same. Here, by changing the thickness of the thermal adhesive film 5 (second thermal adhesive film 5B) or adjusting the number of adhesive films to form the thermal adhesive film 5 (second thermal adhesive film 5B), the distance between the first support film 11A and the second support film 11B can be adjusted. As a result of adjusting this distance, the interlayer capacitance between the two conductive layers 12 can be adjusted. Accordingly, the circuit for driving the touch sensor 10 can be optimized.

Then, as a result of heating the overlaid films and pressurizing them in directions as shown by arrows in FIG. 5D, the overlaid films are bonded together and integrated, and the touch sensor 10 that is supported by the transparent substrate 1 can be formed, as shown in FIG. 5E. The heating and pressurization can be performed by a press. The press preferably uses a vacuum press. As a result of performing pressing under reduced pressure, the films can be bonded with high adhesiveness. The pressing can be performed in a temperature range from 80 to 150° C. and in a period from 5 to 30 minutes, for example, but the temperature and the period are not limited thereto.

Figure 5F:
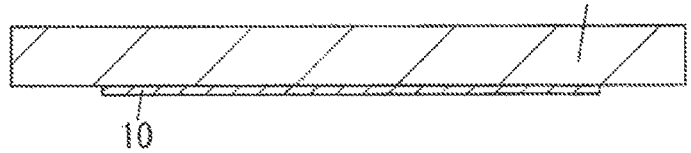

Accordingly, the planar touch sensor 10 is formed as a layer on the surface of the transparent substrate 1, as shown in FIG. 5F.

Figure 6:
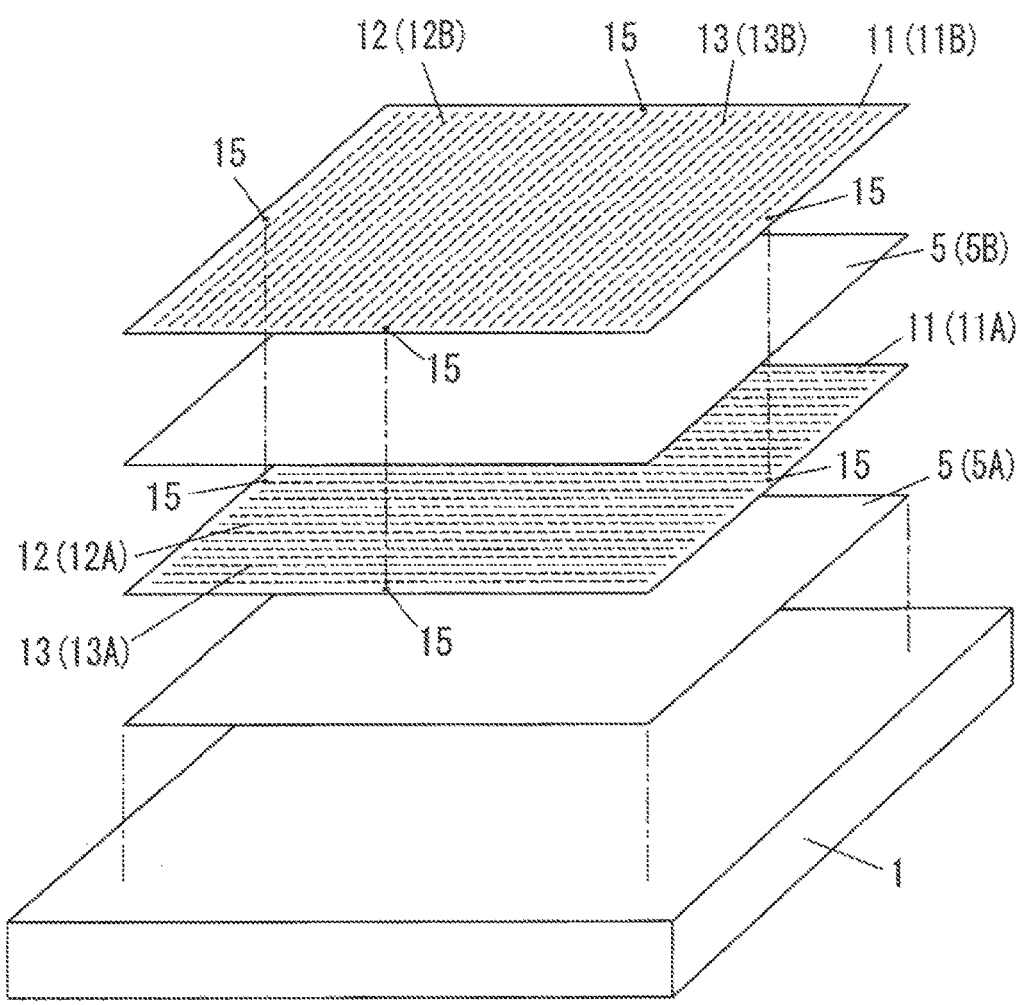
FIG. 6 illustrates an example of the manufacturing method of the touch-sensor-equipped display device and is a perspective view illustrating a manner in which the touch sensor is manufactured.

Overlaying of the members in the manufacturing of the touch sensor 10 will be further described with reference to FIG. 6. FIG. 6 shows a state corresponding to the state shown in FIG. 5D, and a manner of overlaying the transparent substrate 1, the support films 11, and the thermal adhesive films 5 are illustrated. FIG. 6 shows the support film disposition step.

As shown in FIG. 6, when the touch sensor 10 is manufactured, the first thermal adhesive film 5A, the first support film 11A, the second thermal adhesive film 5B, and the second support film 11B are overlaid on an upper surface of the transparent substrate 1. FIG. 6 is illustrated in a vertically inverted manner from FIG. 5D. In actuality, the manufacturing is preferably performed by overlaying the support films 11 and the thermal adhesive films 5 on the transparent substrate 1, as shown in FIG. 6. Note that, in FIG. 6, the conductive layers 12 (electric conductors 13) provided on the respective support films 11 on the transparent substrate 1 side are shown in broken lines to make the configuration easy to understand. Also, although omitted from the illustration, the electric conductor collection portions may be respectively provided in end portions of the support films 11. In this case, the support films 11 may extend sideward, and the electric conductor collection portion may be provided in the extended portions.

Alignment marks 15 are preferably provided in the support films 11. The alignment marks 15 are provided in the first support film 11A and the second support film 11B such that, when the first support film 11A and the second support film 11B are overlaid properly, the corresponding alignment marks 15 of the respective films are located in the same planar positions. The alignment marks 15 are formed in a point-like shape in periphery portions of the support films 11. As shown in FIG. 6, in the present embodiment, the members (the transparent substrate 1, the support films 11, and the thermal adhesive films 5) are formed in a quadrangle, preferably in a rectangle or square. The alignment marks 15 are formed in central portions of sides that form the quadrangles. The positions of the alignment marks 15 are not specifically limited, and the alignment marks 15 may be provided in four corners of the quadrangles, for example. Note that it is more preferable that the alignment marks 15 are provided at the center of the sides in order to improve alignment accuracy in a central portion of the screen. The alignment marks 15 may be formed by printing, for example. Also, the alignment marks 15 may be formed by causing portions of the conductive layers 12 to remain in a point-like shape after etching is performed. Also, the alignment marks 15 may be provided by making holes or cuts in portions of the support films 11.

When the first support film 11A and the second support film 11B are overlaid, the first support film 11A and the second support film 11B can be aligned by causing the corresponding alignment marks 15 to have the same planar positions. As a result of performing alignment using the alignment marks 15, the support films 11 can be aligned with a target accuracy of ±0.2 mm (maximum displacement is 0.2 mm or less). Here, in the case where an adhesive tape or the like is used, when the support films 11 are overlaid, the support films 11 are bonded together by the adhesive tape, and as a result it is difficult to finely adjust the positions of the support films 11 that are once overlaid. Thus, overlaying with high accuracy is required when bonding is performed, re-bonding of the support films 11 once overlaid is difficult, and therefore bonding of the support films 11 with high positional accuracy is not easy. On the other hand, in the case of using the thermal adhesive films 5, since the thermal adhesive films 5 do not have adhesiveness before being heated, finely adjusting positions of the support films 11 can be easily performed by moving the support films 11 horizontally (in a direction parallel to the surface of the transparent substrate 1) or the like, in a state in which the members are overlaid. As a result of this fine adjustment, alignment can be more reliably performed, and the support films 11 and the transparent substrate 1 can be bonded together and integrated by heating and pressurization in a state of being aligned. Accordingly, the members are easily bonded with high positional accuracy, and the touch sensor 10 can be formed.

Incidentally, although a method in which one thermal adhesive film 5 is disposed between the members is shown in the above description, two or more thermal adhesive films 5 may be disposed between the transparent substrate 1 and a support film 11, and/or between support films 11 In this case, the thickness can be adjusted by the number of thermal adhesive films 5.

Figure 7A:
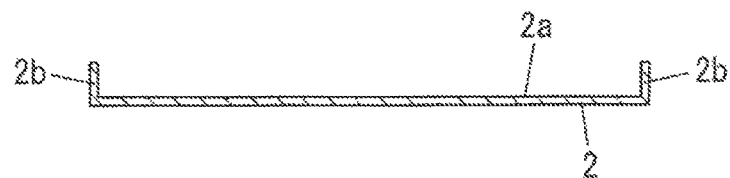
FIGS. 7A to 7D illustrate an example of the manufacturing method of the touch-sensor-equipped display device and are cross-sectional views.
Figure 7B:
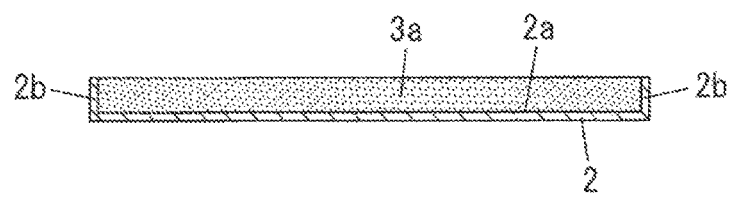
Figure 7C:
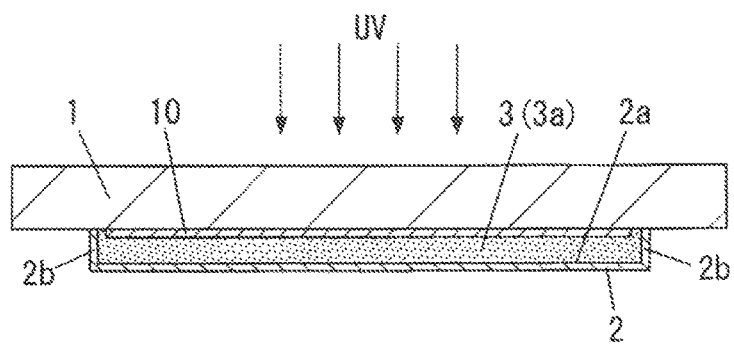

FIGS. 7A to 7D show an example of the manufacturing method of the touch-sensor-equipped display device, and a manner in which the transparent substrate 1 to which the touch sensor 10 is attached and the image-display body 2 are bonded together. FIG. 7C, of FIGS. 7A to 7D, illustrates the resin curing step.

When the transparent substrate 1 and the image-display body 2 are bonded, first, the image-display body 2 shown in FIG. 7A is prepared. The image-display body 2 in which a display portion is made of liquid crystal or the like and the frame portion 2b is formed in the periphery portion can be used. The frame portion 2b may protrude in a direction toward that in which an image is displayed.

Next, as shown in FIG. 7B, the recess 2a formed by the frame portion 2b is filled with a resin composition 3a. The resin composition 3a is made of a photo-curable resin. Here, the resin composition 3a is in a state of having fluidity, and fills the entire recess 2a.

Next, as shown in FIG. 7C, the transparent substrate 1 and the image-display body 2 are overlaid with the photo-curable resin being located therebetween. The transparent substrate 1 is disposed such that the surface on which the touch sensor 10 is provided is on an image-display body 2 side. The image-display body 2 is disposed such that the image display surface is on a transparent substrate 1 side. At this time, because the resin composition 3a has not being cured, the resin composition 3a adheres to the touch sensor 10, and the filling ability improves. Also, the positions of the transparent substrate 1 and the image-display body 2 can be finely adjusted in the horizontal direction. Then, in a state in which the transparent substrate 1 and the image-display body 2 are overlaid, the resin composition 3a is provided with light (such as UV light) from the outside of the transparent substrate 1. FIG. 7C shows a manner in which ultraviolet (UV), as a preferable mode of light, lighting is performed. As a result of the lighting, the photo-curable resin is cured, and the resin layer 3 is formed by the cured resin. Here, the thermal adhesive films 5 are formed such that light in a wavelength region with which the photo-curable resin is cured can pass therethrough. Accordingly, the resin is cured by the light that has passed through the thermal adhesive films 5. The width of the space between the image-display body 2 and the touch sensor 10 may be set to 1 to 10 mm. Therefore, the resin layer 3 can be provided so as to have a thickness of approximately 1 to 10 mm. Note that, from the viewpoint of suppressing double reflection of an image, it is preferable that the difference between the refractive indices of the resin layer 3 and the transparent substrate 1 is smaller. The difference of absolute values thereof may be preferably less than 0.2, more preferably 0.1 or less, and further more preferably 0.05 or less, but is not limited thereto.

Figure 7D:
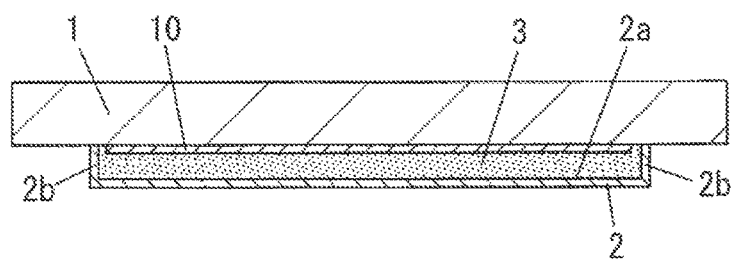

As shown in FIG. 7D, as a result of bonding between the transparent substrate 1 and the image-display body 2, the touch-sensor-equipped display device including the transparent substrate 1, the touch sensor 10, the image-display body 2, and the resin layer 3 can be obtained. The transparent substrate 1 and the image-display body 2 are preferably bonded by the resin layer 3. A structure in which the transparent substrate 1 and the image-display body 2 are bonded together in a planar manner is also referred to as direct bonding. Also, the frame portion 2b of the image-display body 2 and the transparent substrate 1 may be fixed at the contact portion therebetween by a fixing means. The fixing means may be fixing by an adhesive, fixing by a fitting structure, or the like. The touch-sensor-equipped display device shown in FIG. 7D may be thereafter provided with other members such as the casing 4, the electronic circuit that constitutes the controller, and the like, as shown in FIG. 1.

Incidentally, although the step in which the photo-curable resin is disposed on the surface of the image-display body 2 on the transparent substrate 1 side is shown as a step of disposing the resin was described above, the photo-curable resin may be disposed on a surface of the transparent substrate 1 on which the support films 11 are bonded. Alternatively, the photo-curable resin may be provided on both surfaces of the image-display body 2 on the transparent substrate 1 side and the surface of the transparent substrate 1 on which the support films 11 are bonded. Alternatively, after the transparent substrate 1 on which the touch sensor 10 is formed and the image-display body 2 are bonded at the frame portion 2b, the photo-curable resin may be injected into a space formed between the transparent substrate 1 and the image-display body 2. In short, as a result of the photo-curable resin being disposed between the transparent substrate 1 and the image-display body 2, the resin layer 3 can be formed. The step of disposing resin is defined as a resin disposition step in which the photo-curable resin is disposed on at least one of the surface of the image-display body 2 on the transparent substrate 1 side and the surface of the transparent substrate 1 on which the support films 11 are bonded. Note that, in order to improve the filling ability of the resin, it is preferable that the recess 2a is provided in the image-display body 2, and the recess 2a is filled with the photo-curable resin, as described above.

Here, the thermal adhesive films 5 preferably have optical transmittance of 50% or more at a wavelength of 395 nm. Light of a wavelength with which the photo-curable resin is cured can pass through the thermal adhesive films 5, and strikes the photo-curable resin, and therefore the photo-curable resin can be easily cured. The optical transmittance of the thermal adhesive films 5 at a wavelength of 395 nm is more preferably 60% or more, and further more preferably 70% or more. Although the optical transmittance, strictly speaking, is a transmittance before bonding, in the case where the transmittance scarcely changes before and after bonding, the transmittance may be the transmittance of the thermal adhesive films 5 after being cured by heat.

The optical transmittance of the thermal adhesive films 5 at a wavelength of 365 nm is preferably 10% or less. Light on the short wavelength side (ultraviolet light) can be cut by the thermal adhesive films 5, entering of ultraviolet light to the inside can be suppressed, and thus deterioration of the device can be suppressed. For example, in the case where the touch-sensor-equipped display device is installed in a location that may be exposed to ultraviolet light such as outdoors, there is concern that the degradation of the device advances due to ultraviolet light, but the influence of ultraviolet light can be reduced by cutting off the ultraviolet light. The optical transmittance of the thermal adhesive films 5 at a wavelength of 365 nm is more preferably 5% or less, and further more preferably 3% or less. Although the optical transmittance, strictly speaking, is a transmittance before bonding, in the case where the transmittance scarcely changes before and after bonding, the transmittance may be the transmittance of the thermal adhesive films 5 after being cured by heat.

The preferable mode of the thermal adhesive film 5 is such that the optical transmittance at a wavelength of 395 nm is 50% or more, and the optical transmittance at a wavelength of 365 nm is 10% or less. Conventionally, in films that express adhesiveness due to heat such as the thermal adhesive films 5, a film whose transmittance of ultraviolet light is reduced has been commonly used. This is because this type of thermal adhesive film is used in building applications and automotive applications, and it is preferable that the ultraviolet light is not transmitted therethrough. The ultraviolet light cutting off function is often realized by an ultraviolet absorbent being contained in the thermal adhesive film. This type of thermal adhesive film is designed such that the optical transmittance at a wavelength of 365 nm is decreased as much as possible, using the wavelength of 365 nm as a reference. However, if the thermal adhesive film used in these applications is used as-is as the thermal adhesive films 5 for the touch-sensor-equipped display device, there is concern that the thermal adhesive films 5 cut out light of a wavelength with which the photo-curable resin is cured, and the photo-curable resin is not favorably cured. Many types of photo-curable resin are cured by ultraviolet light and light in a visible light region (wavelength of 410 nm or less, for example) close to ultraviolet light, and the thermal adhesive films 5 cut off light whose wavelength is in the vicinity of 395 nm. Therefore, in the touch-sensor-equipped display device, the thermal adhesive films 5 whose optical transmittance at a wavelength of 395 nm is preferably 50% or more is used. Because the photo-curable resin that is cured with light of a wavelength of 395 nm or 405 nm exists, the resin is favorably cured with the light of this wavelength, and the resin layer 3 can be formed. Also, if the thermal adhesive films 5 whose optical transmittance at a wavelength of 365 nm is 10% or less is used, the ultraviolet light other than the light of a wavelength used for curing can be prevented from being transmitted as much as possible. Here, ultraviolet light of a shorter wavelength has a higher energy level and has more influence on the device than light of a long wavelength. Therefore, as a result of cutting off ultraviolet light of a short wavelength as much as possible, the negative influence due to ultraviolet light can be suppressed.

The thermal adhesive films 5 preferably contain at least one of an ethylene-vinyl acetate copolymer and polyvinyl butyral as a main component. The main component is a monomer that is to be a principal component of a polymer or a resin component. The ethylene-vinyl acetate copolymer is also referred to as EVA resin. The polyvinyl butyral is also referred to as PVB. When these resins are used, an adhesive layer that can transmit more light of a wavelength with which the photo-curable resin can be cured can be formed. Accordingly, the thermal adhesive film 5 whose optical transmittance of light at a wavelength of 395 nm is 50% or more can be more easily obtained.

The thermal adhesive films 5 preferably contain an ultraviolet absorbent. As a result of containing the ultraviolet absorbent, the thermal adhesive films 5 whose optical transmittance at a wavelength of 365 nm is 10% or less can be more easily obtained.

The thermal adhesive films 5 may contain an appropriate additive agent other than the main component that is made of at least one of an ethylene-vinyl acetate copolymer and polyvinyl butyral, and the ultraviolet absorbent. Examples of the additive agent include a polymerization initiator, a polymerization inhibitor, and the like. Specific examples of the thermal adhesive films 5 include "Melthene-G" (from Tosoh Corporation) for EVA, and SentryGlas Expressions (registered trademark) from Dupont for PVB.

In the manufacturing of the touch-sensor-equipped display device, light for curing is preferably light whose peak wavelength is in a range from 390 to 410 nm. Light can effectively pass through the thermal adhesive films 5, and the photo-curable resin can receive the light to be cured. The peak wavelength may be a value of the wavelength at which a peak having the highest height appears when relative values of a light amount is depicted with respect to the wavelength in a graph. As a result of the light having relatively short wavelength whose peak wavelength is 410 nm or less, curability can be improved, because the short wavelength light has a higher energy level. The light for curing more preferably has a peak wavelength in a range from 390 to 400 nm.

A light source of light for curing is not specifically limited, and may be a metal halide lamp, a super-high pressure mercury lamp, or the like, for example. When the metal halide lamp is used, light to be emitted may have a peak in the vicinity of a wavelength of 405 nm in addition to the component in wavelengths of 365 nm or less, and this light can be used for curing. When the super-high pressure mercury lamp is used, the light to be emitted may have peaks in the vicinity of wavelengths of 405 nm (h line) and 436 nm (g line) in addition to the component in wavelengths of 400 nm or less, and this light can be used for curing. Also, an LED light source in a visible light region can be used as the light source. In this case, an LED lamp having a peak wavelength of 405 nm (h line), in particular, can be preferably used.

The photo-curable resin preferably has a characteristic of being cured with light at a wavelength of 410 nm or less. The photo-curable resin is cured when being provided with the light at a wavelength of 410 nm or less, and the resin layer 3 can be effectively cured. The photo-curable resin preferably has a property of being cured with light at a wavelength of 405 nm, and more preferably has a characteristic of being cured with light at a wavelength of 395 nm. The photo-curable resin further more preferably is an ultraviolet curable resin. The ultraviolet curable resin is a resin having a characteristic of being cured when being provided with ultraviolet light. Some ultraviolet curable resins have a property of being cured not only with ultraviolet light, but also with light in a wavelength region of the visible light region that is close to ultraviolet light. By using such an ultraviolet curable resin, even if the thermal adhesive film 5 suppresses ultraviolet light to some degree, curing can be performed effectively and the resin layer 3 can be formed. Therefore, the ultraviolet curable resin preferably has a property of being cured with light at a wavelength of 395 nm, and more preferably has a property of being cured with light at a wavelength of 405 nm. The photo-curable resin may be an ultraviolet curable resin "FINESET" (liquid type) from Hitachi Chemical Company, Ltd. or the like. The photo-curable resin may have a characteristic of not being cured with light of a wavelength exceeding 450 nm, but the photo-curable resin is not limited thereto.

Figure 8:
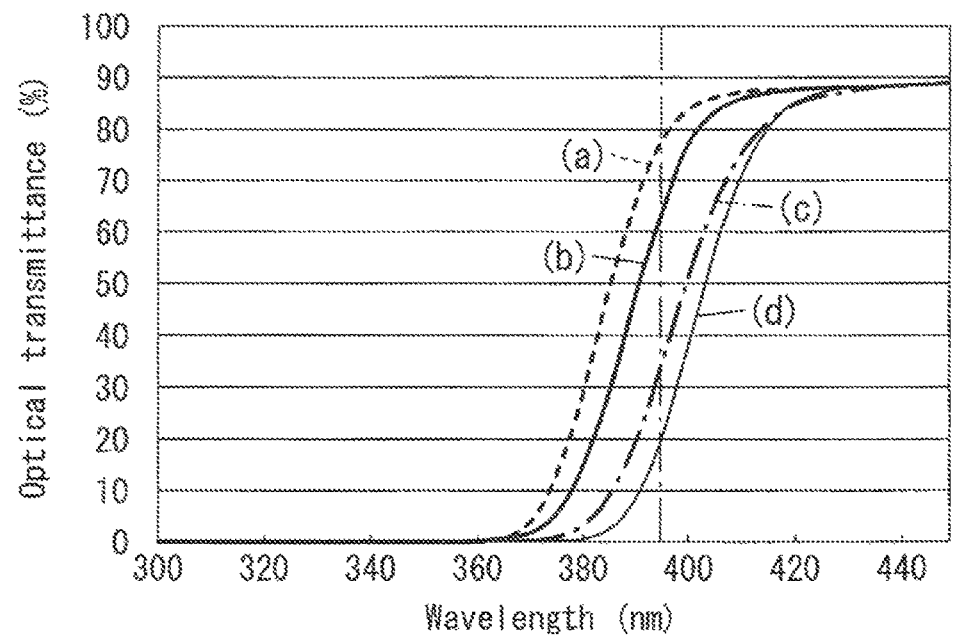
FIG. 8 is a graph illustrating an example of light-transmission characteristics of thermal adhesive films.

FIG. 8 is a graph illustrating an example of light-transmission characteristics of the thermal adhesive film 5. In this graph, the horizontal axis shows light wavelength and the vertical axis shows optical transmittance. Curves denoted by (a) and (d) show optical transmittance of the thermal adhesive films 5 formed of resin whose main component is polyvinyl butyral. Curves denoted by (b) and (c) show optical transmittance of the thermal adhesive films 5 formed of resin whose main component is an ethylene-vinyl acetate copolymer. The thicknesses of the films are 0.75 mm for (a) and (d), 0.3 mm for (b), and 0.8 mm for (c). The thermal adhesive films 5 of (a) and (b) have optical transmittance exceeding 50% at a wavelength of 395 nm. Light at a wavelength of 410 nm or less, specifically light at 395 nm (ultraviolet light) can pass therethrough, and the photo-curable resin can be cured. On the other hand, the thermal adhesive films 5 of (c) and (d) have optical transmittance below 40% at a wavelength of 395 nm, and therefore there is a concern that sufficient curability may not be obtained. The thermal adhesive film 5 is preferably made of resin that can transmit light at a wavelength of 395 nm as much as possible. Also, the thermal adhesive films 5 of (a) to (d) have optical transmittance below 10% at a wavelength of 365 nm. Therefore, an effect of cutting off ultraviolet light of a short wavelength can be obtained. Accordingly, the thermal adhesive films 5 of (a) and (b) that have relatively high optical transmittance at a wavelength of 395 nm and relatively low transmittance at a wavelength of 365 nm are more preferable. Note that the thermal adhesive films 5 of (c) to (d) have optical transmittance exceeding 60% at a wavelength of 410 nm, and although curability may be considered to be improved, the period required for curing may increase because the light energy decreases as the wavelength increases. With this in mind, the thermal adhesive films 5 of (a) and (b) are more preferable.

Figure 9:
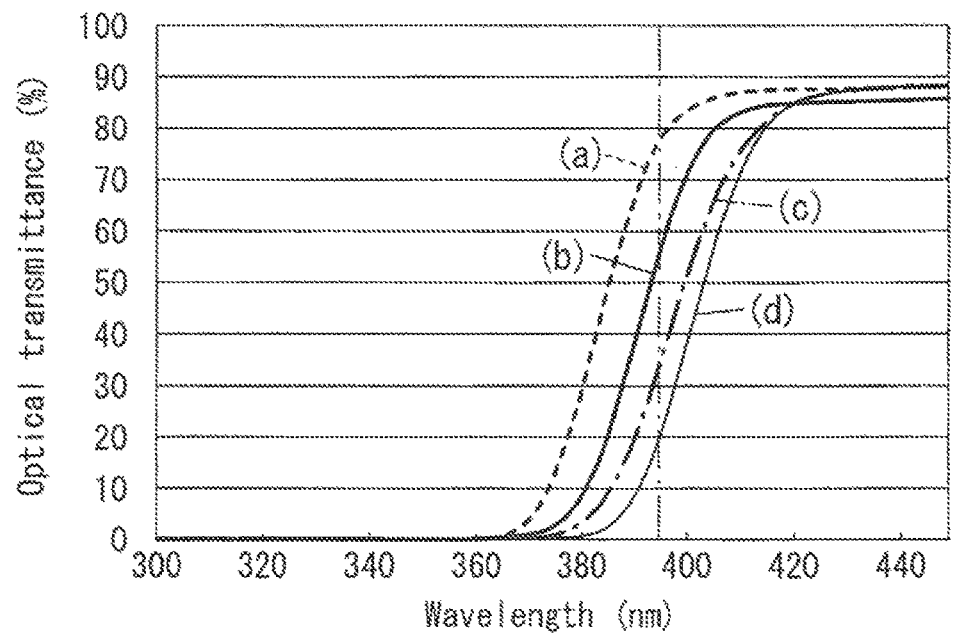
FIG. 9 is a graph illustrating an example of light-transmission characteristics of thermal adhesive films.

FIG. 9 is a graph illustrating another example of light-transmission characteristics of the thermal adhesive films 5. In this graph, the horizontal axis shows light wavelength and the vertical axis shows optical transmittance. Curves denoted by (a) and (d) show optical transmittance of the thermal adhesive films 5 formed of resin whose main component is polyvinyl butyral. Curves denoted by (b) and (c) show optical transmittance of the thermal adhesive films 5 formed of resin whose main component is an ethylene-vinyl acetate copolymer. The thicknesses of the films are 0.75 mm for (a) and (d), and 0.8 mm for (b) and (c). The thermal adhesive films 5 of (a) and (b) have optical transmittance exceeding 50% at a wavelength of 395 nm. Light at a wavelength of 410 nm or less, specifically light at 395 nm (ultraviolet light) can pass therethrough, and the photocurable resin can be cured. Also, the thermal adhesive films 5 of (a) to (d) have optical transmittance below 10% at a wavelength of 365 nm. Therefore, an effect of cutting off ultraviolet light of a short wavelength can be obtained. The reason that the thermal adhesive films 5 of (a) and (b) are more preferable than the thermal adhesive films 5 of (c) and (d) is similar to that described for FIG. 8.

When the members in the manufactured touch-sensor-equipped display device are bonded by using the thermal adhesive film 5, the structure thereof may be different from that when the members are bonded by an optical clear adhesive that has adhesiveness at room temperature. Also, the structure may be different from that when the members are bonded by coating an adhesive having fluidity. For example, in the case where the bonding is performed using the thermal adhesive films 5, it may be observed that, in an end portion of the overlaid films after bonding, end portions of respective films are not flush with each other such that the thermal adhesive film 5 may extend outward a little further than the support film 11 or the thermal adhesive film 5 is formed a little bit smaller than the support film 11. Also, it can be confirmed whether the material of the adhesive layer originates from a film, an optical clear adhesive, or a resin having fluidity by analyzing the material. Therefore, bonding by the thermal adhesive film 5 can be confirmed by performing analysis.

Figure 10:
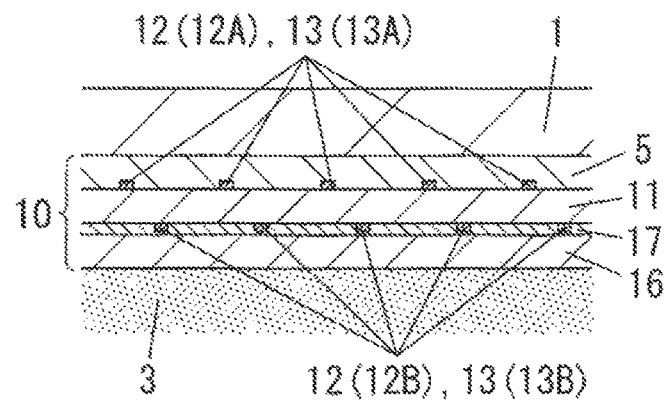
FIG. 10 is an enlarged cross-sectional view illustrating an example of the touch-sensor-equipped display device.

FIG. 10 shows another embodiment of the touch-sensor-equipped display device. In this diagram, a portion of a touch sensor 10 is illustrated in an enlarged manner. The entire configuration may be the same as that shown in FIGS. 1A and 1B. The same configurations as those of the embodiment shown in FIGS. 1A to 1C are provided with the same reference numerals, and description thereof will be omitted.

In the example shown in FIG. 10, the touch sensor 10 includes one support film 11. Conductive layers 12 are formed on both surfaces of the support film 11. The patterns of the two conductive layers 12 may be similar to those of the embodiment described above. That is, electric conductors 13 that constitute a conductive layer 12 formed on one surface of the support film 11 and electric conductors 13 that constitute a conductive layer 12 formed on the other surface of the support film 11 extend in different directions.

The conductive layer 12 formed on a surface of the support film 11 on a transparent substrate 1 side constitutes a first conductive layer 12A. The conductive layer 12 formed on a surface of the support film 11 on an opposite side thereof from the transparent substrate 1 constitutes a second conductive layer 12b.

As shown in FIG. 10, a protective film 16 is bonded to a surface of the support film 11 on a resin layer 3 side by an adhesive layer 17. With the protective film 16, the second conductive layer 12B can be protected, and the reliability of the device can be improved. The protective film 16 may be formed of a thermal adhesive film 5. In this case, the adhesive layer 17 can be omitted, and the thermal adhesive film 5 can be directly bonded to the support film 11. Also, the protective film 16 may be formed of the support film 11 on which the conductive layer 12 is not provided. The protective film 16 can be easily formed.

In the touch-sensor-equipped display device shown in FIG. 10, the transparent substrate 1 and the support film 11 are bonded together by the thermal adhesive film 5. The transparent substrate 1 and the support film 11 can be easily bonded together. Also, alignment of the transparent substrate 1 and the support film 11 can be easily performed.

In the example shown in FIG. 10, since the conductive layers 12 are formed on both surfaces of the support film 11, the alignment between the two conductive layers 12 can be controlled by pattern formation of the conductive layers 12 on the both surfaces of the support film 11. Therefore, when pattern formation on the both surfaces of the support film 11 can be performed with high accuracy, the device shown in FIG. 10 is an advantageous configuration. Also, the distance between the first conductive layer 12A and the second conductive layer 12B in a thickness direction can be controlled by the thickness of the support film 11. Therefore, it can be an advantageous configuration when electrostatic capacitance is adjusted by the thickness of the support film 11. Note that there is concern that the pattern formation of the conductive layers 12 on both surfaces of the support film 11 with high accuracy may be difficult. Therefore, the configuration in which two or more support films 11 on each of which the conductive layer 12 is provided are overlaid, as shown in FIG. 1, are normally considered to be more advantageous.

Figure 11:
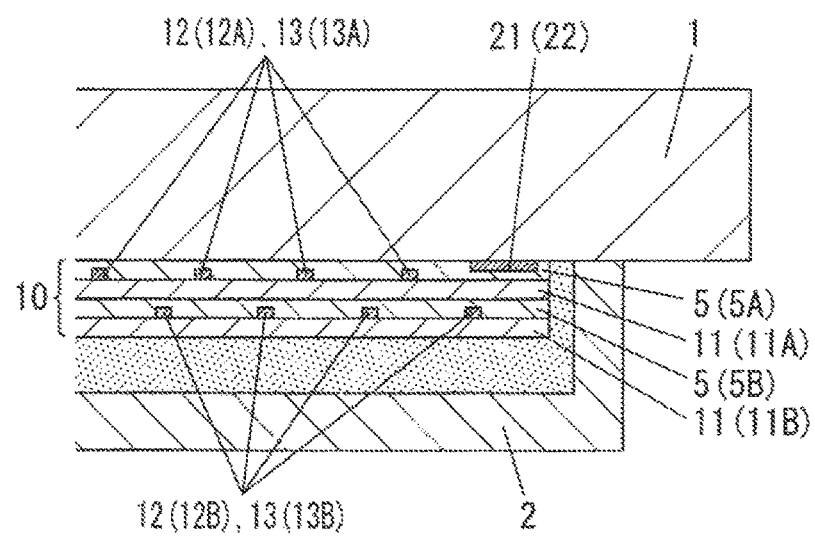
FIG. 11 is an enlarged cross-sectional view illustrating an example of the touch-sensor-equipped display device.

FIG. 11 shows another embodiment of the touch-sensor-equipped display device. In this diagram, the vicinity of an end portion of the touch-sensor-equipped display device is illustrated in an enlarged manner. The entire configuration may be the same as that shown in FIGS. 1A and 1B. The same configurations as those of the embodiment shown in FIGS. 1A to 1C are provided with the same reference numerals, and description thereof will be omitted.

In an example shown in FIG. 11, a pattern substance 21 is provided on a surface of the transparent substrate 1 on a touch sensor 10 side. The pattern substance 21 may be composed of a print layer 22, for example. As a result of the pattern substance 21 being provided, when the touch-sensor-equipped display device is viewed from the outside, the pattern can be seen, and the design can be improved.

The pattern substance 21 may be provided in a frame-like shape so as to surround a portion in which an image is displayed by an image-display body 2, for example. In this case, a pattern of a screen frame can be formed. As a result of an image being fitted inside the frame, design is improved.

The pattern substance 21 formed of the print layer 22 can be provided on the transparent substrate 1 by performing printing on the transparent substrate 1 before the touch sensor 10 is formed. The pattern substance 21 can be embedded into a thermal adhesive film 5 when the touch sensor 10 is formed.

Figure 12:
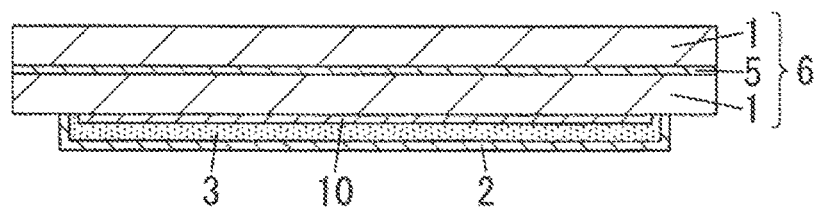
FIG. 12 is a cross-sectional view illustrating an example of the touch-sensor-equipped display device.

FIG. 12 shows another embodiment of the touch-sensor-equipped display device. The same configurations as those of the embodiment shown in FIGS. 1A to 1C are provided with the same reference numerals, and description thereof will be omitted.

In an example shown in FIG. 12, another transparent substrate 1 is provided on an outside of a transparent substrate 1, and these transparent substrates 1 are bonded with a thermal adhesive film 5. The thermal adhesive film 5 that bonds together two or more transparent substrates 1 can use the adhesive film 5 that bonds the support films 11 and the transparent substrate 1 described in the above embodiments.

The substrate in which two or more transparent substrates 1 are bonded with the thermal adhesive film 5 forms a transparent laminated body 6. In the transparent laminated body 6, two or more transparent substrates 1 are laminated. As a result of using the transparent laminated body 6, protection performance can be improved. That is, as a result of the substrate for supporting a touch sensor 10 and protecting the inside being multi-layered, the strength and safety can be improved. When the two or more transparent substrates 1 are made of glass, the transparent laminated body 6 can be configured as a cover glass by a so-called laminated glass in which two or more plates of glass are laminated. By using the laminated glass, the strength of the cover glass improves. Also, with such a laminated glass, even when the glass is broken or cracked, scattering of pieces of broken glass can be suppressed by the adhesive that bonds the glass plates together, and as a result safety is improved. Also, the transparent laminated body 6 may be formed by a transparent substrate 1 made of glass and a transparent substrate 1 made of resin being bonded with the thermal adhesive film 5. In this case, the transparent substrate 1 made of glass is preferably disposed on an inner side (touch sensor 10 side). That is, the transparent substrate 1 made of resin is disposed on the outside. As a result of forming the transparent laminated body 6 with a complex substrate made of glass and resin, the strength and safety can be favorably improved. Resin having high strength is preferable in order to suppress scratching. For example, polycarbonate can be used as a resin used for the transparent substrate 1 that is included in the transparent laminated body 6.

An example shown in FIG. 12 illustrates the transparent laminated body 6 in which two transparent substrates 1 are laminated. Of course, the number of the transparent substrates 1 is not limited to two, and may be three or more. Also, each thickness of the transparent substrates 1 may be appropriately set. The pattern substance 21 described above may exist between one transparent substrate 1 and the other transparent substrate 1. In this case, design can be improved.

A manufacturing method of the touch-sensor-equipped display device shown in FIG. 12 includes disposing two or more transparent substrates 1 with the thermal adhesive film 5 being located therebetween, fabricating the transparent laminated body 6 by heating and pressurizing the disposed transparent substrates 1, and using the transparent laminated body 6 as the substrate. Heating and pressurization can be performed by vacuum pressing. The transparent laminated body 6 can be used as the substrate for forming the touch sensor 10. Formation of the touch sensor 10 on a surface of the transparent laminated body 6, and bonding of the image-display body 2 thereto may be performed by the similar method described above. In this method, since the transparent substrate 1 is bonded using the thermal adhesive film 5, the transparent substrate 1 can be easily bonded with high positional accuracy. Also, when the thermal adhesive film 5 allows light of a wavelength with which the photo-curable resin is cured to pass though, more preferably when the optical transmittance at a wavelength of 395 nm is 50% or more and the optical transmittance at a wavelength of 365 nm is 10% or less, the resin layer 3 can be easily formed. Accordingly, the touch-sensor-equipped display device can be easily formed.

In the manufacturing of the touch-sensor-equipped display device shown in FIG. 12, the transparent laminated body 6 and the touch sensor 10 may be formed at the same time. For example, two or more transparent substrates 1 and one or more support films 11 including a conductive layer 12 are overlaid with the thermal adhesive film 5 being located therebetween, and heating and pressurization can be performed thereon. In this case, the thermal adhesive film 5 located between the members express adhesiveness, and the transparent laminated body 6 and the touch sensor 10 are formed at the same time. In this method, since the transparent laminated body 6 and the touch sensor 10 can be formed at the same time, manufacturing can be performed effectively. In this case also, as a result of using the thermal adhesive film 5 that does not have adhesiveness before being heated, bonding can be performed with high positional accuracy. Also, as a result of using the thermal adhesive film 5 described above, the photo-curable resin can be cured.

Each touch-sensor-equipped display device according to the embodiments described above can be used as a display device such as a display having a touch sensor function, and can also be used in various applications. For example, the touch-sensor-equipped display device can be attached on a wall, or can be attached to furniture. In such a case, it is preferable to form an embedded type display device. The touch-sensor-equipped display device enables display of an image in a large screen, and the touch-sensor-equipped display device is attached to an architectural structure or furniture, whereby the design and operability thereof can be improved.

The invention claimed is:

1. A touch-sensor-equipped display device comprising:
   a touch sensor comprising:
      a first conductive layer composed of a plurality of first electric conductors that are arranged in parallel and extend in a belt like manner;
      a second conductive layer composed of a plurality of second electric conductors that are arranged in parallel and extend in a belt like manner in a direction that is different from a direction in which the plurality of the first electric conductors extend; and
      at least one support film;
   a transparent substrate that supports the touch sensor;
   an image-display body that is disposed on an opposite side of the touch sensor from the transparent substrate;
   an adhesive layer formed of a thermal adhesive film that bonds the at least one support film and the transparent substrate and is made of a thermoplastic resin; and
   a resin layer that is disposed between the touch sensor and the image-display body and is made of a photo-curable resin which is curable with light having a wavelength of larger than or equal to 390 nm and smaller than or equal to 410 nm,
   the thermal adhesive film having optical transmittance of 10% or less at a wavelength of 365 nm and optical transmittance of 50% or more at a wavelength of 395 nm.

2. The touch-sensor-equipped display device according to claim 1, wherein the thermal adhesive film comprises at least one of an ethylene-vinyl acetate copolymer and polyvinyl butyral as a main component and an ultraviolet absorbent.

3. The touch-sensor-equipped display device according to claim 1,
   wherein the touch sensor comprises, as the support film, a first support film that supports the first conductive layer and a second support film that supports the second conductive layer, and
   the first support film and the second support film are bonded by the thermal adhesive film.

4. The touch-sensor-equipped display device according to claim 1, wherein each electric conductor of the first electric conductors and the second electric conductors is composed of copper thin lines formed in a pattern that allows light to pass through between the copper thin lines.

5. A touch-sensor-equipped display device manufacturing method comprising:

a support film disposition step in which at least one support film is disposed on a transparent substrate with a thermal adhesive film which is made of a thermoplastic resin being located between the support film and the transparent substrate in an overlaid manner, the at least one support film supporting a first conductive layer composed of a plurality of first electric conductors that are arranged in parallel and extend in a belt like manner, and a second conductive layer composed of a plurality of second electric conductors that are arranged in parallel and extend in a belt like manner in a direction that is different from a direction in which the plurality of first electric conductors extend;

a bonding step in which the transparent substrate and the at least one support film are bonded by heating and pressurization; and a resin curing step in which the transparent substrate and an image-display body are stacked with a photo-curable resin located between the transparent substrate and the image-display body, and the photo-curable resin is cured by being provided with light from a transparent substrate side, the thermal adhesive film having optical transmittance of 10% or less at a wavelength of 365 nm and optical transmittance of 50% or more at a wavelength of 395 nm, and the light that irradiates in the resin curing step having a peak wavelength of 390 to 410 nm.

6. The touch-sensor-equipped display device manufacturing method according to claim 5, wherein the thermal adhesive film comprises at least one of an ethylene-vinyl acetate copolymer and polyvinyl butyral as a main component and an ultraviolet absorbent.

* * * * *